US009251160B1

(12) United States Patent
Wartnick

(10) Patent No.: US 9,251,160 B1
(45) Date of Patent: Feb. 2, 2016

(54) DATA TRANSFER BETWEEN DISSIMILAR DEDUPLICATION SYSTEMS

(71) Applicant: Symantec Corporation, Mountain View, CA (US)

(72) Inventor: Jeremy Wartnick, Minnetonka, MN (US)

(73) Assignee: Symantec Corporation, Mountain View, CA (US)

( * ) Notice: Subject to any disclaimer, the term of this patent is extended or adjusted under 35 U.S.C. 154(b) by 248 days.

(21) Appl. No.: 13/929,097

(22) Filed: Jun. 27, 2013

(51) Int. Cl.
*G06F 17/30* (2006.01)

(52) U.S. Cl.
CPC .................................. *G06F 17/30156* (2013.01)

(58) Field of Classification Search
CPC .................................................. G06F 17/30156
USPC ........................................................... 707/692
See application file for complete search history.

(56) References Cited

U.S. PATENT DOCUMENTS

| | | | | |
|---|---|---|---|---|
| 6,658,423 | B1 * | 12/2003 | Pugh | G06F 17/3071 |
| 8,341,528 | B2 | 12/2012 | Chaudhary et al. | |
| 8,392,384 | B1 * | 3/2013 | Wu et al. | 707/693 |
| 8,396,841 | B1 * | 3/2013 | Janakiraman | 707/692 |
| 2008/0005141 | A1 * | 1/2008 | Zheng | G06F 3/0608 |
| 2008/0034162 | A1 * | 2/2008 | Sturges et al. | 711/129 |
| 2010/0138827 | A1 * | 6/2010 | Frank et al. | 718/1 |
| 2011/0307447 | A1 * | 12/2011 | Sabaa | H04L 67/2842 707/637 |
| 2012/0030477 | A1 * | 2/2012 | Lu et al. | 713/189 |
| 2013/0018855 | A1 * | 1/2013 | Eshghi | G06F 11/1453 707/692 |
| 2013/0086006 | A1 * | 4/2013 | Colgrove | G06F 3/0688 707/692 |
| 2013/0151484 | A1 * | 6/2013 | Kruglick | 707/692 |
| 2013/0268497 | A1 * | 10/2013 | Baldwin | G06F 17/30159 707/692 |
| 2013/0318051 | A1 * | 11/2013 | Kumar | G06F 17/30156 707/692 |
| 2014/0074840 | A1 * | 3/2014 | Wada | G06F 11/3476 707/737 |
| 2014/0181054 | A1 * | 6/2014 | Starr | G06F 17/30159 707/692 |
| 2014/0214775 | A1 * | 7/2014 | Shi et al. | 707/692 |
| 2014/0244598 | A1 * | 8/2014 | Haustein | G06F 17/30156 707/692 |
| 2015/0066877 | A1 * | 3/2015 | Lillibridge | G06F 3/0641 707/692 |

* cited by examiner

*Primary Examiner* — Noosha Arjomandi
(74) *Attorney, Agent, or Firm* — Campbell Stephenson LLP

(57) ABSTRACT

Various systems and methods for migrating data between deduplication systems. For example, one method involves receiving a fingerprint, where the fingerprint is received from a source computing device at a destination computing device, and the fingerprint is associated with a data segment stored at the source computing device. The method also involves identifying a fingerprint type associated with the fingerprint. The method also involves performing a migration operation from the source computing device to the destination computing device. The migration operation involves determining whether the fingerprint is stored in a fingerprint sub-index. The migration operation also involves determining whether a second fingerprint that corresponds to the data segment is stored in a second sub-index, where the second fingerprint is of a second fingerprint type.

17 Claims, 12 Drawing Sheets

FP Lookup Table
176

| FP Sub-index 410 | FP Sub-index 420 | FP Sub-index 430 |
|---|---|---|
| **TYPE=1** | **TYPE=2** | **TYPE=3** |
| 34F2 | | |
| A26E | | B25 |
| 2013 | 80 | |
| B4F8 | 1B | |
| 57EA | 3C | CB4 |
| 61F1 | 45 | 355 |
| 813A | F0 | |
| 11CE | | |
| 012A | | 7F2 |

Fingerprint Type

FP index entries

Fingerprints

*FIG. 4*

DATA TRANSFER BETWEEN DISSIMILAR DEDUPLICATION SYSTEMS

FIELD OF THE INVENTION

This invention relates to performing deduplication operations, and more particularly, transferring data between deduplication systems.

BACKGROUND

As computers and computer data become increasingly prevalent, the amount of data being stored tends to increase. Advances in storage technology have improved storage system capabilities. Nonetheless, given that storing more data typically requires more storage capacity, and given that storage capacity comes with a price, there is significant interest in reducing the amount of storage space used to store data.

One technique used to reduce the amount of storage space used to store a given amount of data is known as deduplication. Deduplication involves identifying duplicate data and storing a single copy of the duplicate data, rather than storing multiple copies. For example, if two identical copies of a portion of data (e.g., a file) are stored on a storage device, deduplication involves removing one of the copies and instead storing a reference to the removed copy. If access to the removed copy is requested, the request is redirected and the reference is used to access the remaining copy. Since the reference is typically relatively small, relative to the copy of the portion of data, the added space used to store the reference is more than offset by the space saved by removing the duplicate copy.

In order to expedite the process of determining whether identical data is already stored, deduplication engines typically divide the data into portion, or segments, and calculate a signature, or fingerprint for each segment. When a segment is stored, the fingerprint that represents the segment can be added to a list of fingerprints representing stored segments. Then, by comparing a segment's fingerprint with the fingerprints included in the listing of fingerprints, the deduplication engine can determine if the segment is already stored. If so, rather than store another copy of the segment, a reference is stored and a reference counter is updated.

Occasionally, it is desired to migrate data from one storage location (e.g., a source) to another storage location (e.g., a destination). However, this can be complicated if either or both of the source and destination is deduplicated. This is particularly true if the source and target do not use identical deduplication methodology, or schema. For example, if the destination is unable to properly interpret the fingerprints and/or references of the source, the data must be rehydrated and migrated in non-deduplicated form. Once the data has been transmitted from the source to the destination, the data is then deduplicated by the destination according to the deduplication methodology employed by the destination.

This presents several undesirable outcomes. For example, rehydrating and re-fingerprinting data uses significant resources, e.g., computer processing cycles. Furthermore, the rehydrated data is likely to be significantly larger, in terms of bytes, than the deduplicated data. The source and/or destination may be incapable of storing the larger quantity of data. Also, transmitting what may be terabytes (or more) of data consumes network bandwidth, which is typically not unlimited. Furthermore, such migration operations often are scheduled for finite windows of time, and the duration of the migration operations may exceed the allowed window.

Another problem that results from rehydrating and re-fingerprinting data to migrate the data is that the old fingerprints (i.e. those used by the source) are not available at the destination, so data written to the destination cannot be deduplicated against those fingerprints. This perpetuates the necessity of rehydrating and re-fingerprinting data that is migrated to the destination.

What is needed is a way to mitigate or avoid the significant resource consumption involved with rehydrating and re-fingerprinting data, as well as transmitting the increased quantities of data, when migrating data between systems that use dissimilar deduplication methodologies. Such a system would not only avoid the problems discussed above, but would also allow deduplication against the original source fingerprints, further improving the efficiency of migration operations and allowing the migration operations to complete within specified time windows.

BRIEF DESCRIPTION OF THE DRAWINGS

The present invention may be better understood, and its numerous objects, features and advantages made apparent to those skilled in the art by referencing the accompanying drawings.

FIG. 4 illustrates an example fingerprint lookup table including multiple fingerprint sub-indexes, according to one embodiment.

Figure 1:
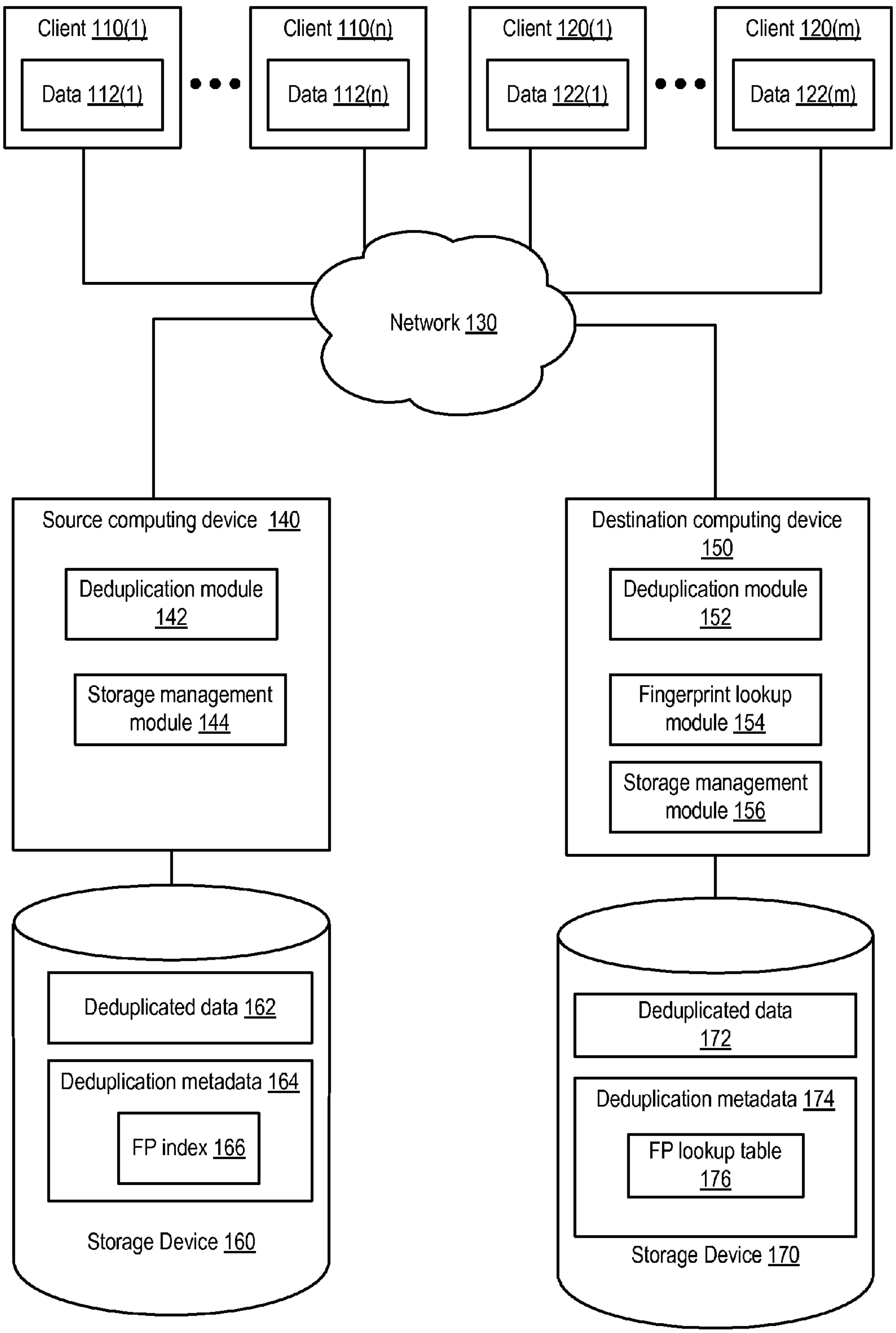
FIG. 1 is a block diagram of a system configured migrate data between systems that use dissimilar deduplication methods, according to one embodiment.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

Data deduplication has become an established technique to improve storage space utilization. Deduplication services help reduce an amount of storage needed to store enterprise data (e.g., client data stored on various ones of enterprise client systems) and/or backup copies of the enterprise data by providing a mechanism for storing a piece of information only once. Thus, in a backup context, if a piece of information is stored in multiple locations within a system (e.g., a common piece of client data is stored on multiple client systems), that piece of information can (ideally) be stored once in a deduplicated backup storage area. Also, if the piece of information does not change between a first point in time (e.g., a first backup or a first version of a file) and a second point in time (e.g., a second backup or a second version of a file), then that piece of information need not be stored during a second backup process, as long as that piece of information continues to be stored in the deduplicated backup storage area. Data deduplication can also be employed outside of the backup context, thereby reducing the amount of active storage occupied by duplicate files or data (e.g., reduces the amount of client data that needs to be stored at the clients).

Performing data deduplication involves a system identifying redundant copies of the same data. One way to provide a reasonable likelihood of finding duplicated instances of data is to divide file data into consistently-sized segments, which are analyzed for duplication in the deduplicated data store. Thus, if only a portion of a large file is modified, then only the segment of data corresponding to the modified portion of the file need be stored in the deduplicated data store. The remainder of the segments included in the file need not be stored again in the deduplicated data store. A file (e.g., a backup image) can be divided into a plurality of fixed-size segments or variable-sized segments. Rather than compare a segment itself to each segment stored in a deduplicated data store (which can be enormously time- and processing-prohibitive), identifiers of segments, or fingerprints, are compared to determine whether a given segment is already stored in deduplicated data store.

Deduplication methodology and storage technology continue to evolve and improve. A natural consequence of this is that it is sometimes desired to migrate data from a storage system that uses a first deduplication methodology (e.g., an older or obsolete deduplication methodology) to a storage system that uses a second, distinct deduplication methodology (e.g., a newer or just released deduplication methodology). The first and second deduplication methods are not necessarily compatible. As noted, deduplication involves, among other things, segmentation of data and fingerprint generation. If either of these elements is not performed consistently in two deduplication methodologies (or the methodologies differ in some other such characteristics), the two deduplication methodologies are not compatible. That is, if identical, redundant copies of files are segmented differently, and/or fingerprinted differently, a deduplication engine using one methodology will not recognize copies deduplicated with another methodology as redundant (due to different fingerprints being associated with the files' segments) and will store both copies, thus frustrating the objective of data deduplication, namely, to avoid storing redundant copies of identical data.

A typical deduplication engine maintains a list of fingerprints used by the deduplication engine. The fingerprints represent stored data segments. To determine whether a data segment is stored, the typical deduplication engine receives a fingerprint and compares the fingerprint against the list. The typical deduplication engine is unable to use fingerprints that are not generated according to the same deduplication methodology as used by the typical deduplication engine to determine whether a given data segment is stored. This means that the typical deduplication engine cannot deduplicate against another deduplication engine's deduplicated data, unless the two deduplication engines use identical deduplication methodologies.

Disclosed herein are methods and systems that enable a deduplication engine to recognize and utilize deduplication information (e.g., fingerprints) generated using multiple types of deduplication methodologies. This enables performance of migration operations that involve migrating between dissimilar deduplication systems without transferring data from the source system that is already stored by the destination system. Instead only the much smaller fingerprints are transferred. Doing so involves transferring a smaller amount of data than if the data segments themselves were transmitted. Accordingly, doing so is faster and uses less bandwidth. This also saves resources (e.g., time, processor cycles, memory space) that would otherwise be consumed to rehydrate and re-fingerprint the deduplicated data being migrated. Another advantage realized by embodiments disclosed herein is that multiple deduplication engines, each using distinct fingerprint types, are able to deduplicate against each other.

FIG. 1 is a block diagram of a system configured to perform data migration operations between systems which employ disparate deduplication technologies. As shown, the system of FIG. 1 includes a plurality of clients 110(1) through **110(*n*) which each includes respective data 112(1) through data 112(*n*). Clients 110(1) through 110(*n*) are collectively referred to as clients 110. The system illustrated in FIG. 1 also includes clients 120(1) through 120(*m*), which each includes respective data 122(1) through data 122(*m*) Clients 120(1) through 120(*m*) are collectively referred to as clients 120**.

It will be noted that the variable identifiers "n" and "m" are used to more simply designate the final elements of series of related or similar elements (e.g., clients). The repeated use of such variable identifiers is not meant to imply a correlation between the sizes of such series of elements, although such correlation may exist. The use of such variable identifiers does not require that each series of elements has the same number of elements as another series delimited by the same variable identifier. Rather, in each instance of use, the variable identified may hold the same or a different value than other instances of the same variable identifier.

Clients 110 are computing devices, such as servers, laptop computers, desktop computers, workstations, cell phones, and the like. Clients 110 are configured to execute one or more applications, not shown, such as word processing programs, email programs, graphic editing programs, database applications, or the like. The applications executed by clients 110 are configured to access data 112, for example, by virtue of being configured to read and/or write to data 112. Similarly, clients 120 are configured to implement one or more applications, not shown, such as word processing programs, email programs, graphic editing programs, database applications, or the like. The applications executed by clients 120 are configured to access data 122. Accessing data 122 can include performing input/output (I/O) operations such as, for example, writing to and/or reading from, data 122.

Clients 110 are shown coupled to a source computing device 140 via a network 130. Clients 120 are shown coupled to a destination computing device 150 via network 130. Network 130 can include a WAN (Wide Area Network), such as the Internet, one or more LANs (Local Area Networks), and/or one or more SANs (Storage Area Networks).

Source computing device 140 can be implemented as a personal computer, laptop, desktop, personal digital assistant, cell phone, and the like. Clients 110 are configured to store data in storage device 160 via source computing device 140. For example, source computing device 140 is configured to create backup copies of data 112 and store the backup copies in storage device 160. In one embodiment, storage device 160 represents a shared storage device which is configured to be utilized by clients 110 to store data.

Destination computing device 150 can be implemented as a personal computer, laptop, desktop, personal digital assistant, cell phone, and the like. Clients 120 are configured to store data in storage device 170 via destination computing device 150. For example, destination computing device 150 is configured to create backup copies of data 122 and store the backup copies in storage device 170. In one embodiment, storage device 170 represents a shared storage device which is configured to be utilized by clients 120 to store data.

Storage device 160 and storage device 170 provide persistent data storage, such that data stored on storage devices 160 and 170 will remain stored even after the storage devices are powered off. Storage device 160 and storage device 170 can be, for example, one or more hard disks, compact discs (CD), digital versatile discs (DVD), or other mass storage devices, or one or more storage systems (e.g., a redundant array of independent disks (RAID) system or an optical storage jukebox) that include an array of such storage devices. Storage device 160 and storage device 170 can also be one or more virtual or logical storage devices that are implemented on such physical storage devices and/or storage systems. For example, storage device 160 and storage device 170 can be logical volumes that are implemented on one or more RAID storage systems. Additionally, storage device 160 and storage device 170 can include one or more storage devices. Storage device 160 and storage device 170 can also include one or more types of storage media, including solid state media (e.g., flash drives), optical media (e.g., CDs and DVDs), and magnetic media (e.g., hard disks or magnetic tape). In some embodiments, storage device 160 and storage device 170 can be implemented using cloud storage, in which the storage devices are logical storage devices to which physical storage device(s) are allocated on an as-needed and/or as-contracted basis.

Source computing device 140 includes a deduplication module 142 and a storage management module 144. Storage management module 144 is configured to receive data from clients 110 and write the received data to storage device 160. Storage management module 144 is also configured to receive data and access requests from clients 110, retrieve the data from storage device 160, and return the data to clients 110. Source computing device 140 is configured to store data in storage device 160 in deduplicated format.

Deduplication module 142, is configured to employ a deduplication schema, or methodology. Deduplication module 142 can be implemented as a deduplication engine. The deduplication methodology or schema employed by deduplication module 142 can be set up by a user, such as an administrator. For example, deduplication module 142 is configured to divide data into segments. The segment size can be configured by the user. The segment size may be fixed or variable.

Deduplication module 142 is configured to generate a fingerprint, or signature, for one or more segments of data. A fingerprint is an identifier of a respective segment stored in deduplicated data store 140. A fingerprint can be a checksum, hash value, or other such value that is calculated based upon data within the segment (e.g., within a file segment of client data). In many embodiments, fingerprints are generated by a fingerprint algorithm in a manner (e.g., using a cryptographically strong, collision-resistant hash function) that produces the same identifier value for identical segments, while also producing different identifier values for non-identical segments.

Deduplication module 142 can be configured to employ a default fingerprint algorithm configured to generate a same fingerprint for identical segments of data and different fingerprints for different segments of data. Examples of various fingerprint algorithms include SHA (Secure Hash Algorithm) or MD (Message Digest) algorithm.

Deduplication module 142 is configured to maintain a fingerprint index 166. Fingerprint index 166 can be stored, for example, in deduplication metadata 164. Each fingerprint is the index represents a segment of data stored, for example, in deduplicated data 162. In one embodiment, fingerprint index 166 is configured to support one type of fingerprint, such as fingerprints generated using a SHA (Secure Hash Algorithm) or MD (Message Digest) algorithm.

Source computing device 140 is configured to receive data to store in storage device 160. The data can be arranged as any logical grouping of data, e.g., a file or volume, or physical grouping of data, e.g., a track, extent, or disk. In response to receiving the data at source storage device 140, deduplication module 142 is configured to divide the storage object into one or more segments according to the prespecified segment size, and generate a fingerprint for each segment using the default fingerprint algorithm.

Deduplication module 142 is configured to determine whether a segment of client data is already stored in deduplicated data 162 by comparing a fingerprint for a given segment which is generated using one particular algorithm, with fingerprints in fingerprint index 166, which are also generated using the same algorithm. For example, deduplication module 142 is configured to generate and compare a fingerprint with a list of fingerprints stored in deduplication metadata 164. If the fingerprint is found in deduplication metadata 164, the match indicates that the data segment is already stored, for example, in deduplicated data 162. If deduplication module 142 finds the fingerprint in deduplication metadata 162, deduplication module 142 does not store an additional, redundant, copy of the data segment. Instead, deduplication module 142 updates a reference count to the already stored segment of data, and also updates address information, for example, by writing a pointer, to indicate the location in deduplicated data of the segment. In one embodiment, the reference counter and address information are also stored in deduplication metadata 162.

Source computing device 140 is also configured to migrate data, e.g., from storage device 160 to storage device 170. For example, the user can request that data be migrated for a number of reasons. For example, source server and/or storage device 160 may be decommissioned, may need to go down for maintenance, or the like. Additionally, the deduplication methodology used by source computing device 140 may have become obsolete. For example, in response to advances in fingerprint algorithms (e.g., creating algorithms that are more secure against attack), clients may no longer wish to use an older fingerprint algorithm and may upgrade to a different (e.g., newer or more secure) fingerprint algorithm. In response to detecting such an occurrence, a data migration request can be generated to migrate data, e.g., from source computing device 140 to destination computing device 150. The detection and request can be performed manually, e.g., by a user, or can be automatically performed.

Destination computing device 150 is configured to store data for clients 120 in a storage device 170. Destination computing device 150 includes a deduplication module 152, a fingerprint lookup module 154, and a storage management module 156. Storage management module 156 is configured to receive data from clients 120 and write the received data to storage device 170. Storage management module 156 is also configured to receive data and access requests from clients 120, retrieve the data from storage device 170, and return the data to clients 120. Similar to source computing device 140, destination computing device 150 is configured to store data in a deduplicated format in deduplicated data 172.

Deduplication module 152 is configured to implement a deduplication schema or methodology for destination computing device 150. The deduplication scheme employed by the duplication module 152 is, in one embodiment, different than the deduplication schema implemented by source computing device 140. The differences between deduplication schema can include, for example, differences in segment size and/or differences in the algorithm used to generate fingerprints. Such differences can render the two deduplication schema incompatible. Different fingerprint algorithms are independent from one another and produce different types of fingerprints because the different algorithms use (largely) different mathematical computations. For example, a first fingerprint generated for a segment using a first fingerprint algorithm (or a fingerprint of a first fingerprint type) will be different from a second fingerprint generated for the same segment using a second fingerprint algorithm (or a fingerprint of a second fingerprint type). A client that uses one fingerprint type cannot deduplicate its client data using a fingerprint index that only supports a different fingerprint type because the fingerprints of the first fingerprint type will not match any fingerprints of the second fingerprint type, even if there exists a fingerprint of the second fingerprint type that identifies the same segment. A fingerprint of a first fingerprint type also cannot be converted or "reverse engineered" into a fingerprint of a second fingerprint type. In other words, it is not possible to deduplicate client data by comparing fingerprints of one fingerprint type with fingerprints of another fingerprint type.

For example, if deduplication module 142 divides data into segment of 10 KB, even if identical data is deduplicated by deduplication module 152, if deduplication module 152 uses a different segment size (e.g., 20 KB), deduplication will be ineffective since identical data will never be found, as a result of the difference deduplication segment sizes. That is, the fingerprint generated for a 20 KB segment of a file will not match the fingerprint generated for a 10 KB segment of the same file. This is true even if the two deduplication modules used the same fingerprint algorithm, which is not necessarily the case.

Destination computing device 150 also includes fingerprint lookup module 154. Fingerprint lookup module 154 is configured to enable data migration between systems employing different deduplication engines. Fingerprint lookup module 154 is configured to generate and create an index of fingerprints such as fingerprint lookup table 176, which is shown stored in deduplication metadata 174. Fingerprint lookup table 176 is configured to support a number of dissimilar fingerprint types. Rather than store fingerprints of a single fingerprint type, fingerprint lookup table 176 is configured to store fingerprints of different fingerprint types, where the stored fingerprints correspond to the segments stored in deduplicated data 172. Fingerprint lookup table can include several fingerprint sub-indexes, where each fingerprint sub-index stores fingerprints of a single type. Fingerprint lookup table 176 can also be configured to store associations between one or more fingerprints of different fingerprint types, where the one or more fingerprints correspond to a single segment. Fingerprint lookup table thus provides a central repository of fingerprints of differing fingerprint types that can be used by various clients to perform deduplication. Additional details of fingerprint lookup table 176 are illustrated with regard to FIG. 3.

To perform migration between systems employing deduplication, destination computing device 150 is configured to receive one or more fingerprints from a source computing device, such as source computing device 140. Destination computing device 150 is configured to then determine a fingerprint type associated with the received fingerprints. If, for example, the fingerprint type of the received fingerprints matches the type of fingerprints used by destination computing device 150, destination computing device 150 can deduplicate the data received from source computing device 140 against its own data. That is, destination computing device 150 can compare the received fingerprints with a list of fingerprints just generated by destination computing device 150. If the fingerprints match, destination computing device 150 concludes that the data represented by the fingerprints is already stored in deduplicated data 172. In this case, the data does not need to be transferred from source computing device 140 to destination computing device 150. If the fingerprint types are the same, but the fingerprints are not found, deduplication data 172 does not include a copy of the data represented by the fingerprints and destination computing device 150 is configured to request that source computing device 140 transmit the data to destination computing device 150.

If, on the other hand, the fingerprints received from source computing device 140 are not the same type of fingerprints as used by destination computing device 150, destination computing device 150 is configured to determine the type of fingerprints received from source computing device 140. In one embodiment, source computing device 140 is configured to send information identifying the type of fingerprints being sent to destination computing device 150 along with the fingerprints. For example, source computing device 140 can send a message with one or more fingerprints and indicate that the fingerprints are, for example, MD5 type fingerprints. In response to receiving such information, destination computing device 150, specifically fingerprint lookup module 154, is configured to determine whether or not a sub-index for the received type of fingerprints already exists, for example in fingerprint lookup table 176. If fingerprint lookup module 154 determines that a sub-index for the received type of fingerprint exists, in this example a sub-index of MD5 fingerprints, destination computing device 150 is configured determine whether the received fingerprints are already stored in the sub-index. If so, the data represented by the fingerprints is already stored in deduplicated data 172 and does not need to be stored again. Instead, destination computing device 150 can update a reference count and address information, such as pointers. Destination computing device 150 can then send an indication to source computing device 140 that data represented by the sent fingerprints has been successfully migrated and is stored in storage device 170.

If, on the other hand, the fingerprints are not stored in the fingerprint sub-index corresponding to the fingerprint type, destination computing device 150 is configured to update the fingerprint sub-index by adding the fingerprints to the sub-index. Destination computing device 150 is then configured to generate a corresponding fingerprint of the type used by deduplication module 152. In one embodiment, this involves destination computing device 150 requesting that source computing device 140 transmit the data corresponding to the received fingerprints in response to determining that the fingerprints are not found previously in the sub-index.

In response to receiving the data from source computing device 140, destination computing device 150 specifically, deduplication module 152, generates a fingerprint for the data. Deduplication module 152 then determines whether the fingerprint is already stored in a fingerprint sub-index corresponding to the type of fingerprints used by destination computing device 150. This could be the case, for example, if identical data was already stored by one of clients 120. If the fingerprint is found under the fingerprint sub-index, destination computing device 150 is configured to discard the data. Otherwise, if the fingerprint is not found, destination computing device 150 is configured to update fingerprint lookup table 176 by adding the generated fingerprint to an entry corresponding to the received fingerprints. That is, an entry for this particular segment of data will now include both fingerprints of the type generated by source computing device 140, and of the type generated by destination computing device 150.

Figure 2:
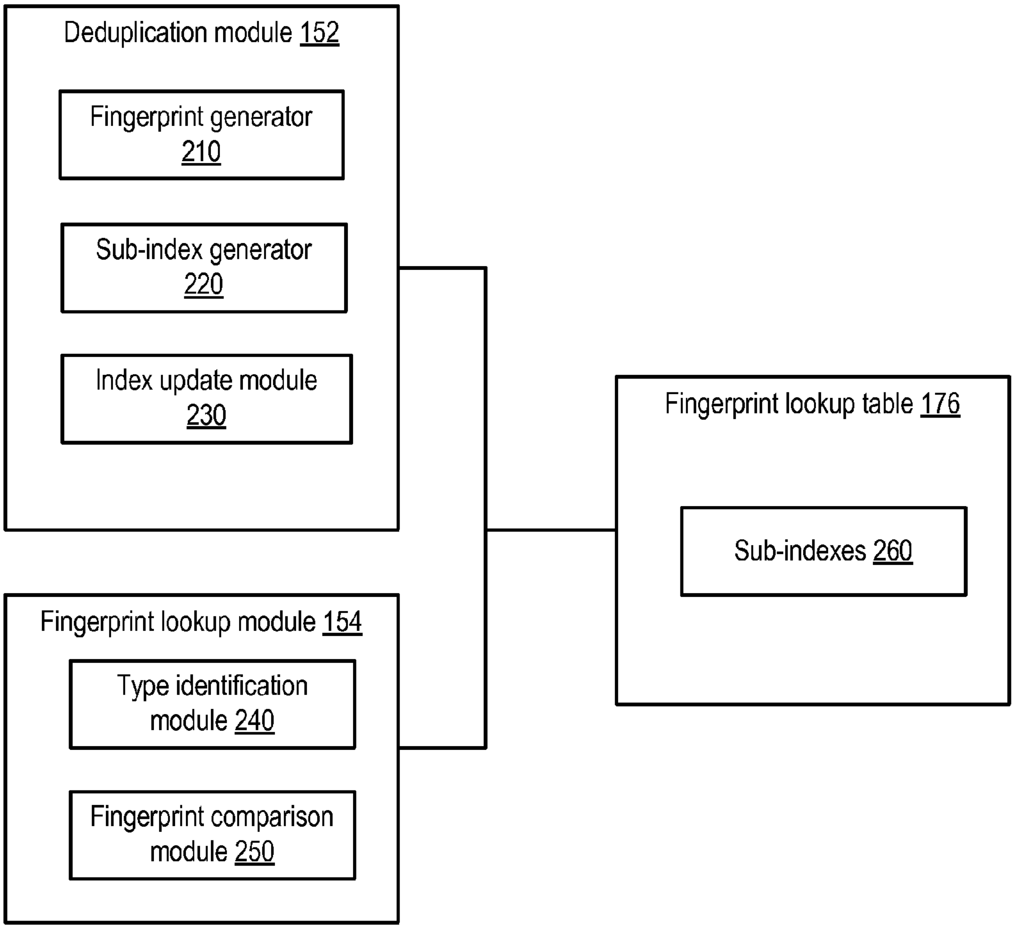
FIG. 2 is a block diagram showing additional details of components configured to migrate data between systems that use dissimilar deduplication methods, according to one embodiment.

FIG. 2 shows, in greater detail, elements of a system configured to migrate data from a first system that employs a first deduplication engine, such as deduplication module 142 of FIG. 1, to a second system, which employs a second deduplication engine, such as deduplication module 152.

As shown, deduplication module 152 includes a fingerprint generator 210, a sub-index generator 220, and an index update module 230. Deduplication module 152 is configured to receive a portion or segment of data. In response to receiving the segment of data, fingerprint generator 210 is configured to generate a fingerprint, or signature, for the segment of data. In one embodiment, generating a fingerprint involves using an algorithm to hash the segment of data. As a fingerprint is relatively small as compared to the segment, the fingerprint can be used to more quickly (than comparing the entire segment) identify whether identical data is already stored. For example, deduplication module 152 is configured to access a fingerprint lookup table, such as fingerprint lookup table 176 to determine whether a fingerprint is already stored in fingerprint lookup table 176. If so, a segment that corresponds to the fingerprint (from which the fingerprint was generated) is already stored and need not be stored again.

Fingerprint lookup table 176 includes one or more sub-indexes 260. In one embodiment, fingerprint lookup table 176 includes a sub-index for each of several fingerprint types. That is, each sub-index stores one or more fingerprints of a specific type, and only that type. The type of a fingerprint is based on the algorithm that was used to generate the fingerprint. That is, if a fingerprint was generated using MD5 as the fingerprint algorithm, the fingerprint can be stored in a sub-index of fingerprints generated using MD5. Fingerprints generated using a different algorithm, e.g., SHA2, are stored in a different sub-index designated for SHA2 fingerprints. Additional details of a fingerprint lookup table are discussed with regard to FIG. 4.

Sub-index generator 220 is configured to generate new sub-indexes in sub-indexes 260. In one embodiment, sub-index generator 220 generates a new sub-index in response to receiving a fingerprint of a type for which there was currently no sub-index in sub-indexes 260. Additional fingerprint types can be supported by fingerprint lookup table 176 by adding (e.g., appending) a new sub-index to sub-indexes 260, where the newly added sub-index is configured to store fingerprints of the additional fingerprint type. Fingerprint lookup table 176 not only provides a single centralized location that can be used to identify data using a variety of fingerprints schema, fingerprint lookup table 176 also be configured to facilitate deduplication of data across multiple deduplication schema.

Index update module 230 is configured to update fingerprint lookup table 176, specifically one more sub-indexes 260. In one embodiment, updating fingerprint lookup table 176 involves inserting one or more fingerprints into the appropriate sub-index of sub-indexes 260. In order to determine the appropriate sub-index, index update module 230 is configured to compare a fingerprint type associated with a given fingerprint with a list of fingerprint types for which a sub-index is included in fingerprint lookup table 176. In one embodiment, index update module 230 is also configured to update a reference counter associated with a given fingerprint. Index update module 230 is also configured to update address information, such as the address in which a particular segment is stored and one or more pointers to that address.

Fingerprint lookup module 154 includes a type identification module 240 and fingerprint comparison module 250. Type identification module 240 is configured to determine the type associated with a given fingerprint. In one embodiment, determining a fingerprint's type involves sending a request, for example, to a source computing device, such as source computing device 140 of FIG. 1. The request can include information identifying a fingerprint and a query as to the fingerprint's type, e.g., an algorithm that was used to generate the fingerprint. In one embodiment, identifying the fingerprint's type involves parsing the message that that the fingerprint was received in. If the message includes information identifying the type of fingerprints included in the message, type identification module 240 is configured to access the information.

Fingerprint comparison module 250 is configured to compare a given fingerprint with one or more other fingerprints, e.g., fingerprints stored in at least one of sub-indexes 260. In one embodiment, this involves an in-order traversal of the entries in the sub-index.

Figure 3A:
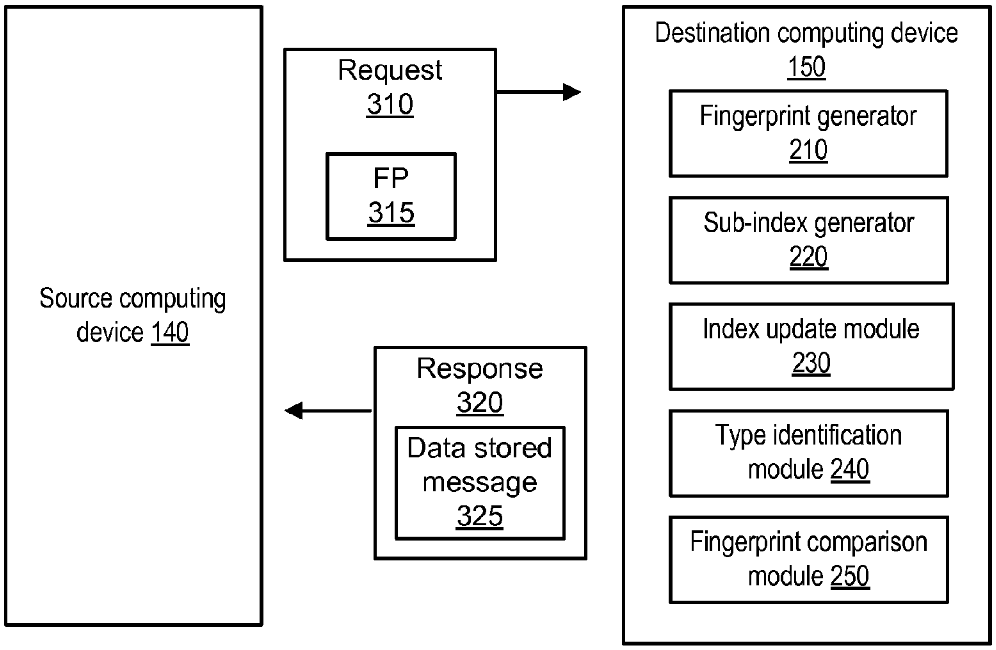
FIG. 3A is a block diagram illustrating message exchange between components configured to migrate data between systems that use dissimilar deduplication methods, according to one embodiment.

FIG. 3A illustrates a system configured to migrate deduplication data, for example, from source computing device 140 to destination computing device 150. As illustrated, destination computing device 150 includes a fingerprint generator 210, a sub-index generator 220, an index update module 230, a type identification module 240, and a fingerprint comparison module 250.

In operation, source computing device 140 sends a request 310 to destination computing device 150. In one embodiment, the request includes one or more fingerprints 315. In addition to fingerprints 315, the request can also include information identifying the type of fingerprints included in request 310. In one embodiment, the information includes identification of an algorithm used to generate the fingerprints 315. In response to a request to migrate data, source computing device 140 identifies at least one fingerprint that corresponds to the data. Source computing device 140 is also configured to identify a corresponding fingerprint type. Source computing device 140 generates an empty request message and inserts the at least one fingerprint and/or the corresponding fingerprint into the empty request message to produce request 310.

Source computing device 140 may also associate an application identifier with request 310, where the application identifier uniquely identifies a client application and/or component that made the migration request. Source computing device 140 is also configured to associate a request identifier with the migration request, where the request identifier uniquely identifies the migration request. Source computing device 140 may also include the request identifier in request 310, which corresponds to the migration request. Source computing device 140 is configured to generate one or more request messages that correspond to a given migration request. For example, source computing device 140 is configured to segregate the fingerprints that correspond to data that is to be migrated per a given migration request into sets, or groups of fingerprints, where each set includes a specified number of fingerprints, e.g., fifty fingerprints per request message. Source computing device 140 is also configured to record or log information about request 310 in order to provide a corresponding response to the component or entity that made the migration request. For example, source computing device 140 may associate and store the application identifier and the request identifier that correspond to request 310.

Destination computing device 150 is configured to generate and transmit a response 320 to source computing device 140. In one embodiment, response 320 includes an indication that the data represented by fingerprints 315 is already stored by destination computing device 150.

Figure 3B:
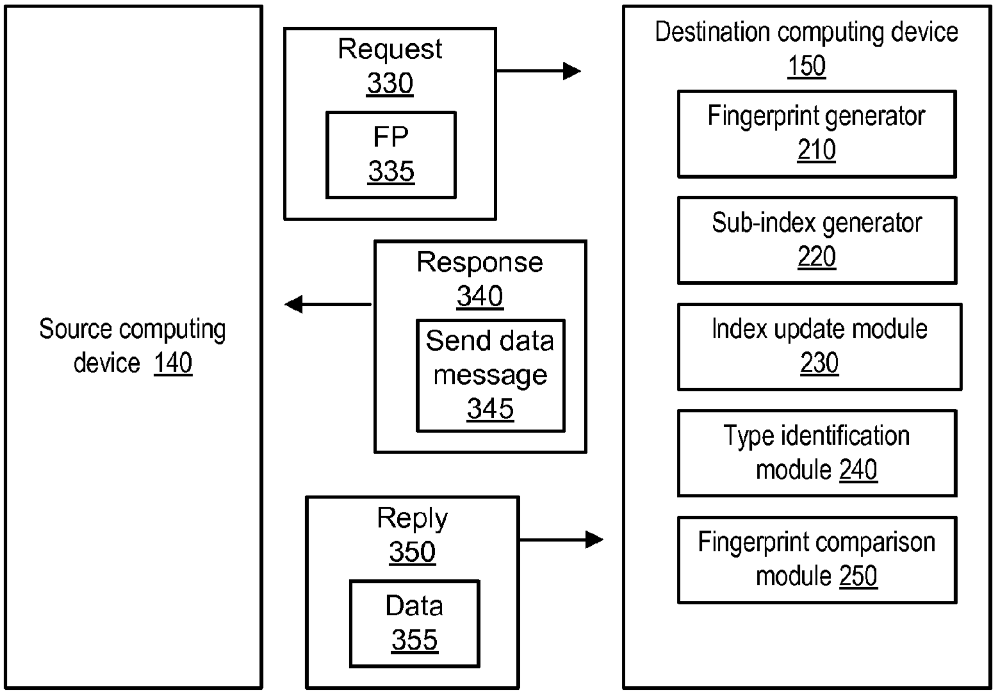
FIG. 3B is a block diagram illustrating message exchange between components configured to migrate data between systems that use dissimilar deduplication methods, according to one embodiment.

FIG. 3B illustrates an embodiment where source computing device 140 sends a request 330 to destination computing device 150. The request includes one or more fingerprints 335, similar to request 310 in FIG. 3A.

Destination computing device 150 is configured to send response 340. Response 340 can include a send data message 345. Send data message 345 indicates that the data represented by fingerprints 335 is not stored or was not located by destination computing device 150. The send data message 345 indicates a source computing device 140 should send the data represented by some or all of fingerprints 335.

In response to receiving response 340, source computing device 140 is configured to send reply 350. In one embodiment, reply 350 includes data 355. Data 355 includes the data segments represented by fingerprints 335.

FIG. 4 illustrates additional details of a lookup table, such as lookup table 176 of FIG. 1. Fingerprint lookup table 176 includes a number of fingerprint sub-indexes including fingerprint sub-index 410, fingerprint sub-index 420, and fingerprint sub-index 430. Each fingerprint sub-index is associated with a specific type. As shown, fingerprint sub-index 410 stores fingerprints of a first fingerprint type, e.g., "Type 1." Fingerprint sub-index 420 stores fingerprints of a second fingerprint type, e.g., "Type 2." Fingerprint sub-index 430 stores fingerprints of a third type, e.g., "Type 3." While fingerprint lookup table 176 is shown in FIG. 4 as including three sub-indexes with three corresponding fingerprint types, more or fewer sub-indexes can be included in fingerprint lookup table 176.

For example, FP sub-index 420 can store MD5 fingerprints, FP sub-index 430 can store SHA-1 160-bit fingerprints, FP sub-index 410 can store SHA-2 256-bit fingerprints, and so on. Each fingerprint sub-index is also associated with an identifier of the respective fingerprint type, and thus each sub-index can be identified by the respective fingerprint type.

Each fingerprint sub-index includes one or more fingerprints. For those fingerprint index entries which include more than one fingerprint, each fingerprint in the entry represents the same segment of data. For example, the second entry in fingerprint lookup table includes the fingerprint 'A26E' in fingerprint sub-index 410. The entry also includes the fingerprint 'B25' in fingerprint sub-index 430. This entry indicates that when fingerprinted using fingerprint type 3, the fingerprint for a given segment associated with this entry is 'B25.' When the same segment is fingerprinted using fingerprint type 1, the fingerprint generated is 'A26E.'

The fingerprints 'A26E' and 'B25' are associated with one another. Such an association is created at the time the fingerprints are added to fingerprint lookup table 176 (or inserted into their respective FP sub-indexes of fingerprint lookup table 176). If a client is aware that two or more fingerprints identify a same segment, the client can instruct fingerprint lookup table 176 to associate the two or more fingerprints (e.g., to create an association that includes the two or more fingerprints) in order to indicate that the two or more fingerprints identify a same segment. Since the two or more fingerprints identify (and thus correspond to) the same segment, only one copy of the segment need be stored in deduplicated data 172, thus reducing the amount of storage needed for deduplicated data 172.

Associations can be created or formed between fingerprints in fingerprint lookup table 176 in a variety of ways, such as by using one or more pointers to associate fingerprints with one another (e.g., use one or more pointers to associate particular sub-index entries that contain the fingerprints), or by including two or more fingerprints in a single object (e.g., an object or record). While fingerprint lookup table 176 can be implemented using one of various optimized types of indexes (e.g., optimized for performance, scalability, and/or capacity), in one embodiment, fingerprint lookup table 176 can be likened to a relational database that includes a number of records, where each record is keyed to fingerprints of one or more fingerprint types.

A fingerprint index entry in fingerprint lookup table 176 can be found (or located) using one or more pairings of a fingerprint and a corresponding fingerprint type, also referred to herein as a fingerprint descriptor. An fingerprint lookup module, such as fingerprint lookup module 154 of FIG. 1, can use the given fingerprint type of a fingerprint descriptor to identify the FP type sub-index (and thus identify a set of sub-index entries) in which to search for the given fingerprint of the fingerprint descriptor. The fingerprint lookup module searches for the given fingerprint in the identified FP type sub-index, such as by comparing the given fingerprint with the fingerprints present in the set of sub-index entries of the identified FP type sub-index. If a matching fingerprint is found (e.g., a fingerprint in a sub-index entry matches the fingerprint of the fingerprint descriptor), the entry containing the matching fingerprint is determined to correspond to the segment identified by the matching fingerprint. The presence of the located entry (containing the matching fingerprint) in fingerprint lookup table 176 indicates that the corresponding segment is already stored in deduplicated data 172.

For example, a client may request a lookup for fingerprint '3C' of the second fingerprint type to determine whether the corresponding segment has already been stored in deduplicated data 172. The fingerprint lookup module uses 'Type 2' to identify FP sub-index 420 (e.g., determines that fingerprint type 'Type 2' matches an identifier associated with FP sub-index 420 and select FP sub-index 420 as the sub-index in which to search for the given fingerprint. The fingerprint service searches for the given fingerprint '3C' in FP sub-index 420 and locates an entry that includes the fingerprint '3C,' which indicates the corresponding segment is already stored in deduplicated data 172. Similarly, another client may request a lookup for fingerprint 230(N) of the third fingerprint type FP". After using fingerprint type FP" to identify and select FP sub-index 410, searching FP sub-index 410 for fingerprint '57EA.' This also locates an entry that similarly indicates the corresponding segment is already stored in deduplicated data 172.

Figure 5:
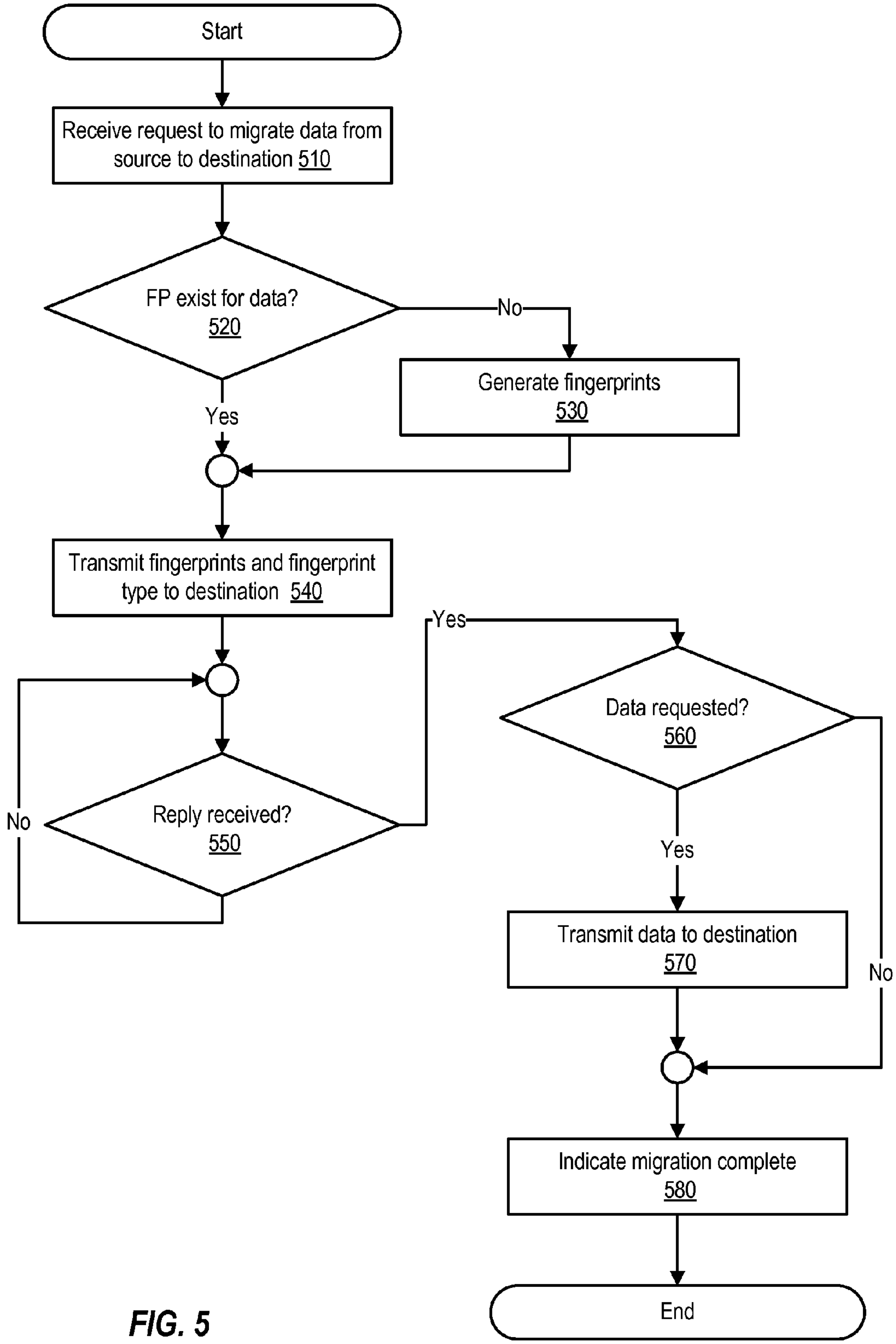
FIG. 5 is a flowchart showing a method of migrating data from a source system, according to one embodiment.

FIG. 5 is a flowchart illustrating a method of migrating data from a deduplicated data store, such as storage device 160 of FIG. 1. In one embodiment, the method is performed by source computing device, such as source computing device 140 of FIG. 1.

At 510, the source computing device receives a request to migrate data from the source to a target. In one embodiment, the migration request is received automatically in response to detecting the occurrence of a pre-specified condition. For example, the migration request can be automatically generated in response to detecting that the amount of available storage has crossed a threshold, that the storage device is scheduled to be brought offline, that there has been a priority change regarding some or all of the data stored in the storage device, that the deduplication methodology associated with the storage device is obsolete, and the like. In one embodiment, the request is received in response to an administrative user's actions. For example, the user can manually initiate generation of a migration request. In one embodiment, the migration request includes information identifying what data needs to be migrated, such as one or more file names, volume identifiers, physical addresses, extents, and the like. The migration request also includes, in one embodiment, information identifying the destination computer device, such as destination computing device 150 of FIG. 1, to which the data is to be migrated, such as a drive identifier, network address, folder name, and the like.

At 520, a deduplication module, such as deduplication module 142 of FIG. 1, determines whether the specified data has been fingerprinted. That is, the deduplication module determines whether fingerprints exist for the data identified by the migration request. If the data has not been duplicated, the deduplication module generates fingerprints for the data at 530. Otherwise, the source computing device generates a message including fingerprints corresponding to the data, such as request 310 of FIG. 3A. In one embodiment, the deduplication module detects a fingerprint type associated with the fingerprints, e.g., the fingerprint algorithm used to generate fingerprints, and includes the fingerprint type in the message. At 540, the source computing device transmits the message to the destination computing device.

At 550, the source computing device waits for a reply from the destination computing device. Though not shown, the source computing device is configured to implement a time-out error process in which the source computing device can generate an error notice if no response is received within in a predetermined time period. In response to receiving a reply that indicates that the fingerprints previously transmitted to the destination computing device were received by the destination computing device, the source computing device parses the reply. At 560, the source computing device determines whether the destination computing device has requested (via the reply) that the source computing device send data corresponding to the fingerprints to the destination computing device. For example, if the destination computing device has determined that the data is already stored by the destination computing device, a reply indicates that additional data, e.g., the data segments corresponding to the previously transmitted fingerprints, need not be transferred by the source computing device. If the destination device has not requested that the data segments be transmitted to the destination computing device, the source computing device indicates that migration is complete at 580. Otherwise, at 570, the source computing device transmits the requested data to the destination computing device. In one embodiment, transmitting the data involves looking up the data in deduplicated storage based on the data's fingerprint, which is used as a key to a location index. Once the source computing device locates the data, the source computing device generates one or more messages that include the data and transmits the message(s) to the destination computing device.

Figure 6:
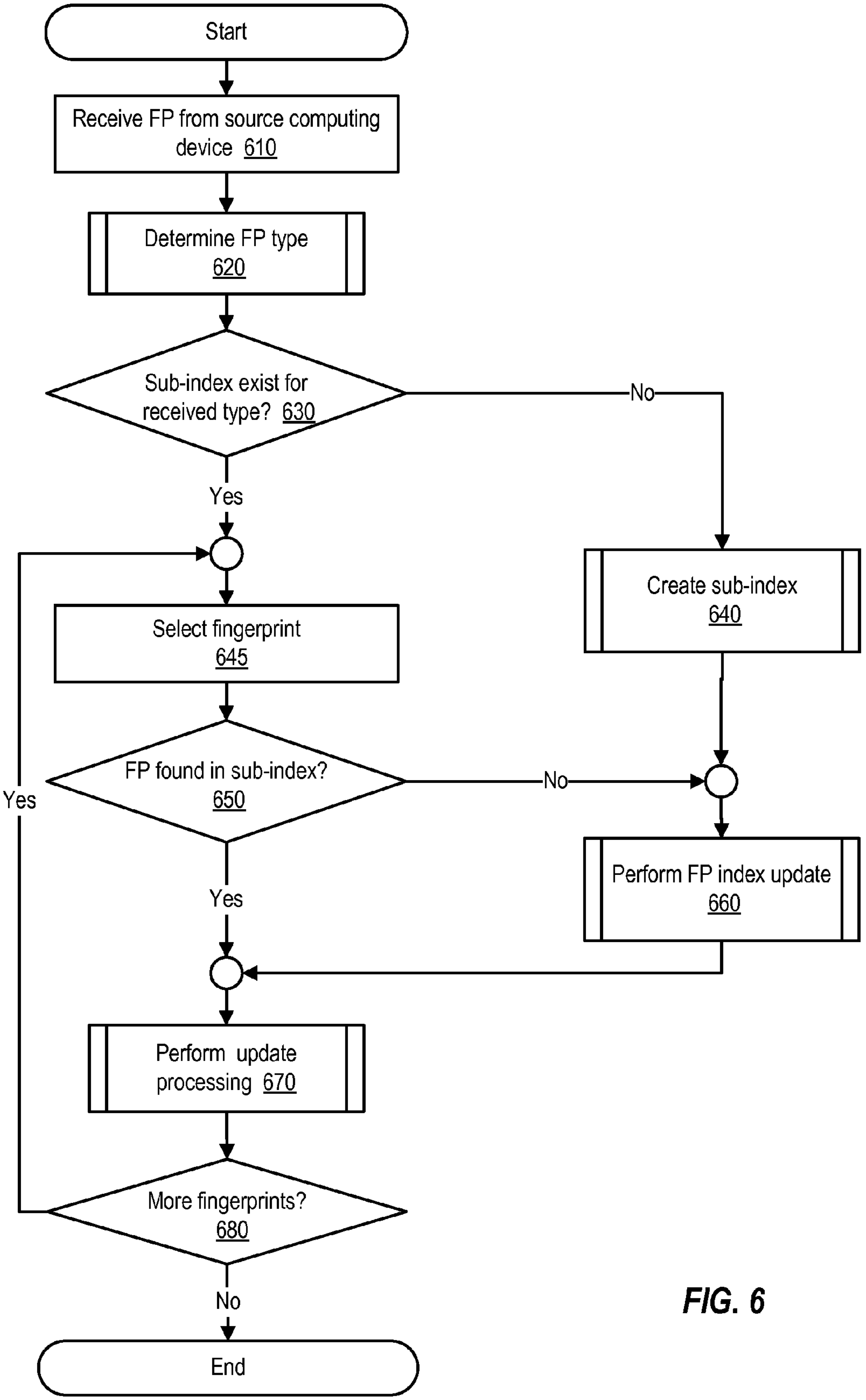
FIG. 6 is a flowchart showing a method of migrating data between systems that use dissimilar deduplication methods, according to one embodiment.

FIG. 6 is as flowchart illustrating a method of migrating data into a deduplicated data store. In one embodiment, the method is performed by a destination computing device, such as destination computing device 150 of FIG. 1.

At 610, the destination computing device receives a message that includes one or more fingerprints from a source computing device, such as source computing device 140 of FIG. 1. The received fingerprints represent data that is to be migrated from the source computing device to the destination computing device. The destination computing device is configured to parse the message to extract the fingerprints from the message. In one embodiment, this involves decrypting and/or decompressing the contents of the message.

At 620, the destination computing device determines a fingerprint type associated with the received fingerprints. As discussed in greater detail with regard to FIG. 7, determining a fingerprint type can be achieved in several different ways, such as querying the source computer device or parsing the message received from the computing device that included the fingerprints.

The destination computing device, specifically a fingerprint lookup module such as fingerprint lookup module 154 of FIG. 1, determines whether a sub-index for the received type of fingerprints exists in a fingerprint lookup table, such as fingerprint lookup table 176 of FIG. 1, at 630. In one embodiment, the fingerprint lookup module compares the determined fingerprint type for the received fingerprints with a list of fingerprint types associated with the various sub-indexes included in fingerprint lookup table. If no sub-index exists for the determined type of fingerprints, the destination computing device creates a sub-index for the determined type of fingerprints at 640. Additional details of how the destination computing device creates a sub-index are discussed with regard to FIG. 8.

If a sub-index for the determined fingerprint type already exists, the destination computing device selects a first fingerprint of the received fingerprints at 645. In one embodiment, the received fingerprints are represented by a list, and the destination computing device performs an in-order traversal of the list, selecting fingerprints from the list in sequential order. In another embodiment, selecting a fingerprint maybe performed by the destination computing device based, for example, on a priority or security indication associated with the received fingerprints.

At 650, the destination computing device determines whether the selected fingerprint is found in a sub-index corresponding to that fingerprint's type. In one embodiment, this involves comparing the selected fingerprints with fingerprints included in the sub-index. If the comparison does not result in a match, the fingerprint is not found in the sub-index. In this case, the destination computing device performs a fingerprint index update at 660, as discussed in greater details with regards to FIG. 9. If the fingerprint is found in the fingerprint sub-index, the destination computing device performs update processing at 670, as discussed in greater detail with regard to FIG. 10. At 680, the destination computing device determines whether more fingerprints remain to be processed. If so, the method returns to 645 and the indexed fingerprint is selected. Otherwise the method ends.

Figure 7:
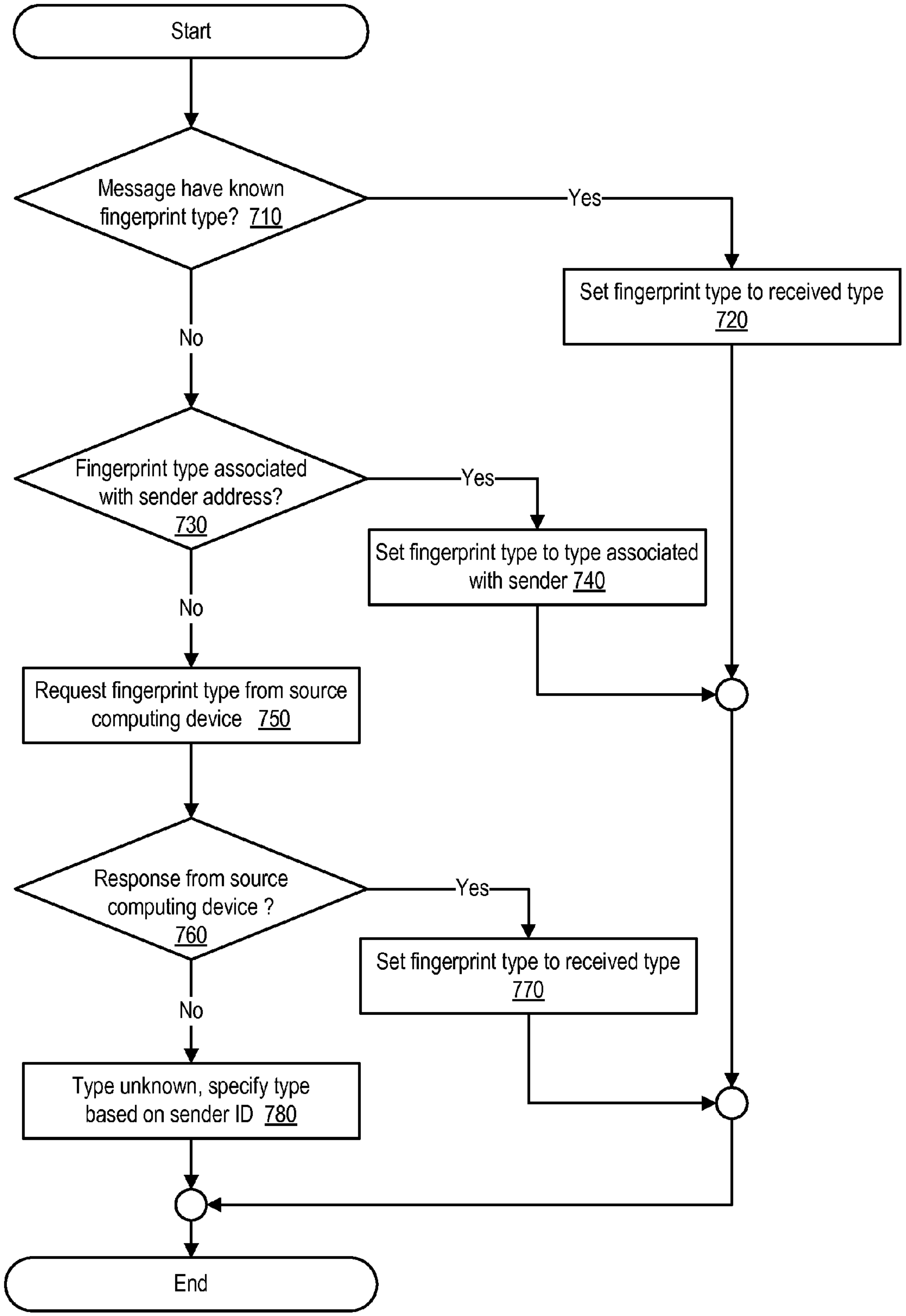
FIG. 7 is a flowchart showing additional details a method of migrating data between systems that use dissimilar deduplication methods, according to one embodiment.

FIG. 7 illustrates a flowchart showing additional details of a method of determining a fingerprint type. In one embodiment, a method can be performed by a type identification module, such as type identification module 240 of FIG. 2.

At 710, the type identification module determines whether a message that was received from a source computing device, such as source computing device 140 of FIG. 1, where the message included one or more fingerprints, also includes information identifying the type of fingerprints included in the message. In one embodiment, this involves parsing the message and extracting data from the message. If the message does include the fingerprint type, once the type identification module identifies the fingerprint type, the type identification module sets the fingerprint type, at 720, to the type indicated in the received message. Based on the identified type, other operations are performed by the destination computing device, such as identifying a sub-index containing the fingerprints of the type identified.

If the message received that included the fingerprints does not also include the fingerprint type, at 730, the type identification module determines whether the fingerprint type is associated with the sender address. For example, the destination computing device can store a list of source computing devices, e.g., the addresses from which fingerprints have been received, and information identifying the types of fingerprints received from the source computing devices. The type identification module can parse this list of source computing devices and fingerprint types received from the source computing devices to determine whether the source computing device that generated and transmitted the message is included in the list. If so, and a fingerprint type is associated with this source computing device, the type identification module sets, at 740, the fingerprint type for the received fingerprints to be the type included in the list.

If the type identification module is unable to determine the type of fingerprints received based on existing information in the destination computing device, the type identification module is configured to request, at 750, the fingerprint type from the source computing device. In one embodiment, this involves the type identification module generating a fingerprint type request message and transmitting the fingerprint type request message from the destination computing device to the source computing device. The fingerprint type request message includes a request that the source computing device reply with a message identifying the type of fingerprints used by the source computing device or the algorithm used to generate the fingerprints by the source computing device.

At 760, the type identification module detects whether a response including the fingerprint type for the receiving fingerprints is received from the source computing device. If a response including a fingerprint type is received, the type identification module sets the fingerprint type of the received fingerprint to be the type indicated in the response received from the source computing device at 770. If no response is received, for example, after waiting a pre-specified period of time, the type identification module determines that the type is unknown, at 780. In one embodiment, the type identification module sets the fingerprint type for the received fingerprints with the source computing device identity. If additional fingerprints are received from the source computing device in the future, those fingerprints can be deduplicated against all fingerprints received from that source computing device even without knowing the fingerprint type.

Figure 8:
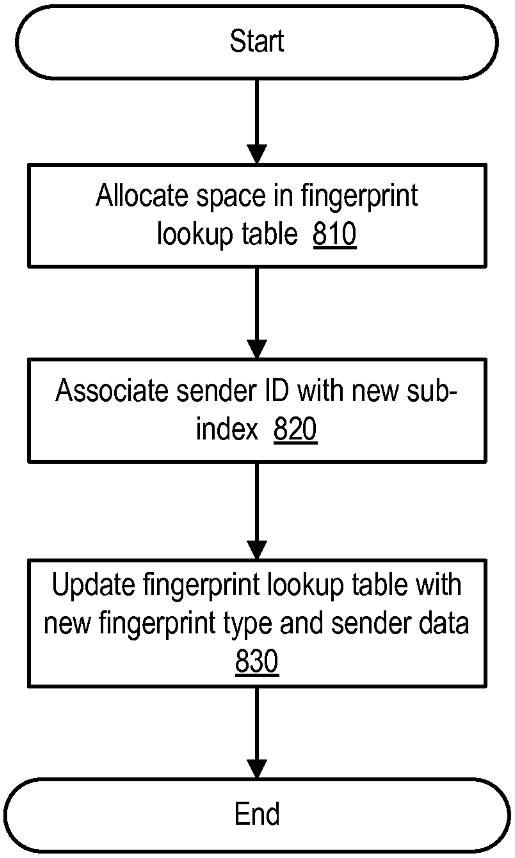
FIG. 8 is a flowchart showing additional details a method of migrating data between systems that use dissimilar deduplication methods, according to one embodiment.

FIG. 8 is a flowchart showing additional details of a method of creating a sub-index. In one embodiment, the method can be performed by a sub-index generator, such as, sub-index generator 220 of FIG. 2. In response to receiving instructions indicating that a new sub-index should be created, the sub-index generator allocates the space in a fingerprint lookup table, such as fingerprint lookup table 176 of FIG. 1, at 810.

At 820, the sub-index generator associates a sender ID with a new sub-index. The sub-index generator is also configured to associate fingerprint type with the new sub-index. In one embodiment, fingerprints that are subsequently received that are associated with the fingerprint type, or are received from the sender associated with the sub-index, will be stored in the sub-index. At 830, the sub-index generator updates the fingerprint lookup table with the fingerprint type and/or sender data.

Figure 9:
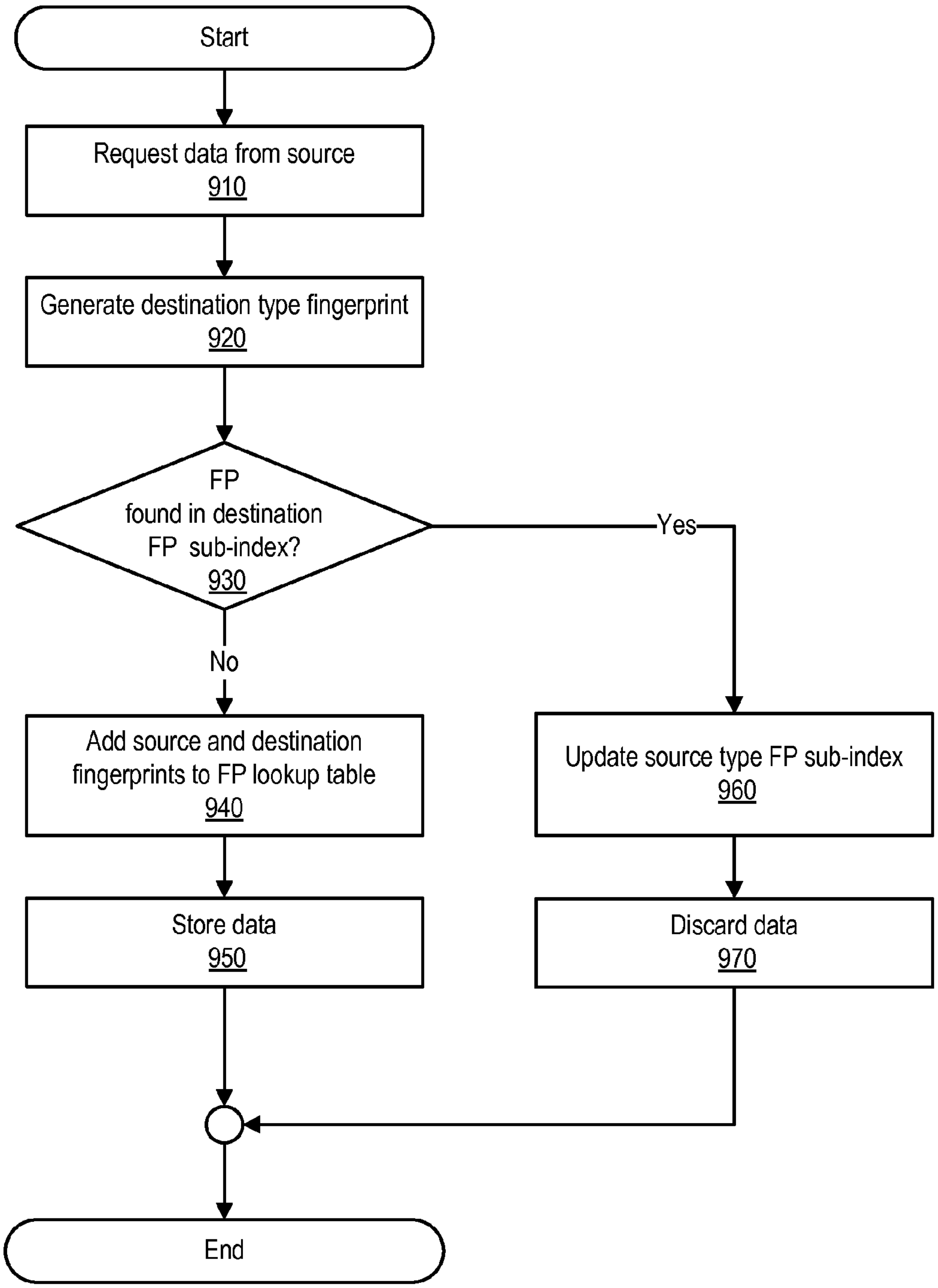
FIG. 9 is a flowchart showing additional details a method of migrating data between systems that use dissimilar deduplication methods, according to one embodiment.

FIG. 9 is a flowchart illustrating additional details of a method of forming a fingerprint index update. The method of FIG. 9 can be performed by an index update module, such as index update module 230 of FIG. 2.

At 910, the index update module requests data from a source computing device, such as source computing device 140 of FIG. 1, which has sent fingerprints to a destination computing device, such as destination computing device 150 of FIG. 1. The index update module requests the segments that correspond to one or more fingerprints in response to determining that one of the fingerprints is not found in a fingerprint sub-index corresponding to the type of fingerprint associated with the received fingerprints.

After receiving the segment from the source computing device, at 920, a fingerprint generator, such as fingerprint generator 210 of FIG. 2, generates a fingerprint for the segment, where the fingerprint is generated using the fingerprint methodology employed by default by the destination computing device. That is, the destination computing device implements a deduplication engine, such as deduplication module 152 of FIG. 1 At 920, a fingerprint generator for the deduplication module generates a fingerprint for the received segment of data. Thus, for every segment received from a source computing device, a fingerprint is generated by the destination computing device, where the fingerprint is of the type used by the destination computing device.

At 930, the index update module determines whether the generated destination type fingerprint is found in a sub-index of fingerprints of the destination type. That is, the deduplication module on the destination computing device maintains a fingerprint lookup table, such as fingerprint lookup table 176 of FIG. 1, that includes fingerprints for each data segment stored on the destination computing device or by the destination computing device. At 930, the index update module determines if the generated fingerprint is found in this list. If the fingerprint is found in the fingerprint sub-index that corresponds to the destination computing device's fingerprint type, then the segment has already been stored by the destination computing device.

If the segment is not already stored by the destination computing device, as indicated by a fingerprint for the segment not being stored in the fingerprint sub-index corresponding to the destination computing device's fingerprint type, the index update module updates the fingerprint lookup table, at 940. Updating the fingerprint lookup table involves adding both the received fingerprint, which corresponds to the fingerprint type used by the source computing device, and the generated target fingerprint to respective sub-indexes in the fingerprint look table. The fingerprint received from the source computing device is added to a sub-index that corresponds to the fingerprint type used by the source, and the fingerprint generated by the destination computing device is added to a sub-index that corresponds to the fingerprint type generated by the destination computing device. The received and generated fingerprints are associated, as they both refer to the same data segment, and comprise an entry in the fingerprint lookup table. At 950, the index update module instructs that the received data be stored, for example, in deduplicated data 172 of FIG. 1.

If, on the other hand, the index update module determines at 930 that the generated destination type fingerprint was already located in the sub-index corresponding to fingerprints of the destination type, the index update module updates the source type fingerprint sub-index at 960. In this case, there is no need to add the destination type fingerprint to the destination type fingerprint sub-index, as the generated fingerprint is already located in the destination type fingerprint sub-index. This indicates that the data received from the source has already been stored by the destination computing device. Since the fingerprint received from the source computing device corresponding to the segment was not found in the fingerprint sub-index corresponding to the fingerprint type used by the source computing device, the data was not previously received from the source computing device but was instead stored by some entity, such as the destination computing device. At 970, the index update module instructs the destination computing device to discard the data, since the data was already stored by the destination computing device.

Figure 10:
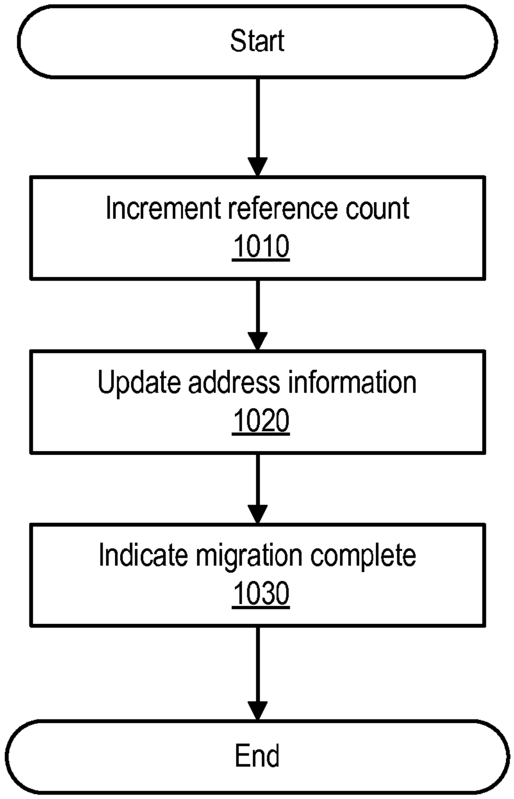
FIG. 10 is a flowchart showing additional details a method of migrating data between systems that use dissimilar deduplication methods, according to one embodiment.

FIG. 10 is a flowchart showing additional details of a method of performing update processing. In one embodiment, the method that is performed by an index update module, such as index update module 230 of FIG. 2. At 1010, the index update module increments a reference count associated with the received fingerprint. The reference count indicates the number of parties who have registered an interest in the segment such as, in this case, a source computing device, such as source computing device 140 of FIG. 1.

At 1020, the index update module updates address information. In one embodiment, this involves storing a pointer to the already stored data segment, rather than storing an additional copy of the data segment. The pointer references the address at which the data segment is stored, e.g., in deduplicated data, such as deduplicated data 172 of FIG. 1. At 1030, the index update module indicates that the segment has been successfully migrated. This is true whether or not the segment was actually transferred, or was already stored by the destination computing device. In one embodiment, this involves generating and transmitting a message to the source computing device.

Figure 11:
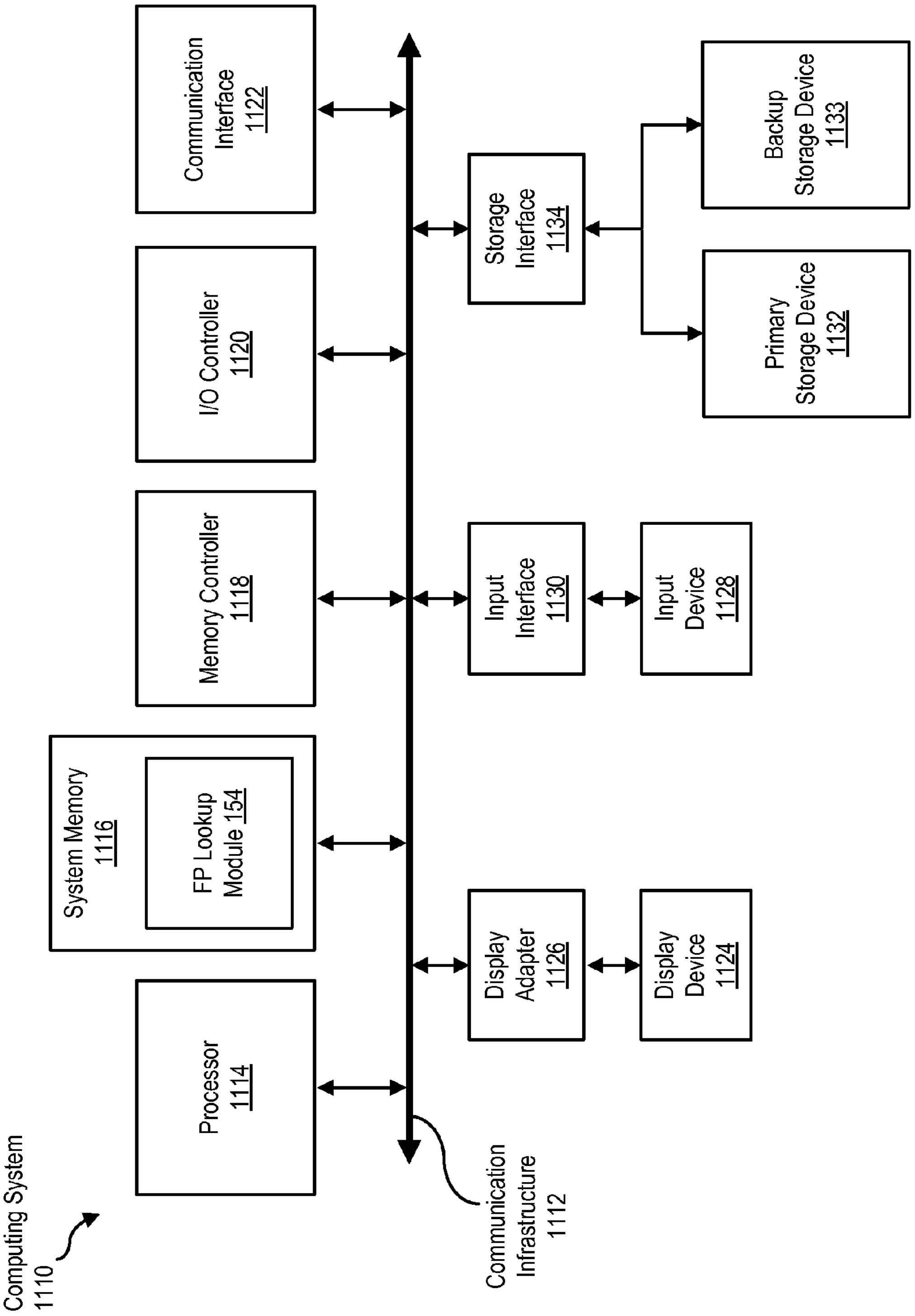
FIG. 11 is a block diagram of a computing device, illustrating how a fingerprint lookup module can be implemented in software, according to one embodiment.

FIG. 11 is a block diagram of a computing device, illustrating how a fingerprint lookup module 154 can be implemented in software, as described above. Computing system 1110 broadly represents any single or multi-processor computing device or system capable of executing computer-readable instructions. Examples of computing system 1110 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 1110 may include at least one processor 1114 and a system memory 1116. By executing the software that implements a fingerprint lookup module 154, computing system 1110 becomes a special purpose computing device that is configured migrate data from a first deduplication environment to a second deduplication environment that uses a dissimilar deduplication methodology than the first, in the manner described above.

Processor 1114 generally represents any type or form of processing unit capable of processing data or interpreting and executing instructions. In certain embodiments, processor 1114 may receive instructions from a software application or module. These instructions may cause processor 1114 to perform the functions of one or more of the embodiments described and/or illustrated herein. For example, processor 1114 may perform and/or be a means for performing the migration operations described herein. Processor 1114 may also perform and/or be a means for performing any other operations, methods, or processes described and/or illustrated herein.

System memory 1116 generally represents any type or form of volatile or non-volatile storage device or medium capable of storing data and/or other computer-readable instructions. Examples of system memory 1116 include, without limitation, random access memory (RAM), read only memory (ROM), flash memory, or any other suitable memory device. Although not required, in certain embodiments computing system 1110 may include both a volatile memory unit (such as, for example, system memory 1116) and a non-volatile storage device (such as, for example, primary storage device 1132, as described in detail below). In one example, program instructions executable to implement a fingerprint lookup module 154 (e.g., as shown in FIG. 1) may be loaded into system memory 1116.

In certain embodiments, computing system 1110 may also include one or more components or elements in addition to processor 1114 and system memory 1116. For example, as illustrated in FIG. 11, computing system 1110 may include a memory controller 1118, an Input/Output (I/O) controller 1120, and a communication interface 1122, each of which may be interconnected via a communication infrastructure 1112. Communication infrastructure 1112 generally represents any type or form of infrastructure capable of facilitating communication between one or more components of a computing device. Examples of communication infrastructure 1112 include, without limitation, a communication bus (such as an Industry Standard Architecture (ISA), Peripheral Component Interconnect (PCI), PCI express (PCIe), or similar bus) and a network.

Memory controller 1118 generally represents any type or form of device capable of handling memory or data or controlling communication between one or more components of computing system 1110. For example, in certain embodiments memory controller 1118 may control communication between processor 1114, system memory 1116, and I/O controller 1120 via communication infrastructure 1112. In certain embodiments, memory controller 1118 may perform and/or be a means for performing, either alone or in combination with other elements, one or more of the operations or features described and/or illustrated herein.

I/O controller 1120 generally represents any type or form of module capable of coordinating and/or controlling the input and output functions of a computing device. For example, in certain embodiments I/O controller 1120 may control or facilitate transfer of data between one or more elements of computing system 1110, such as processor 1114, system memory 1116, communication interface 1122, display adapter 1126, input interface 11100, and storage interface 11104.

Communication interface 1122 broadly represents any type or form of communication device or adapter capable of facilitating communication between computing system 1110 and one or more additional devices. For example, in certain embodiments communication interface 1122 may facilitate communication between computing system 1110 and a private or public network including additional computing systems. Examples of communication interface 1122 include, without limitation, a wired network interface (such as a network interface card), a wireless network interface (such as a wireless network interface card), a modem, and any other suitable interface. In at least one embodiment, communication interface 1122 may provide a direct connection to a remote server via a direct link to a network, such as the Internet. Communication interface 1122 may also indirectly provide such a connection through, for example, a local area network (such as an Ethernet network), a personal area network, a telephone or cable network, a cellular telephone connection, a satellite data connection, or any other suitable connection.

In certain embodiments, communication interface 1122 may also represent a host adapter configured to facilitate communication between computing system 1110 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 11054 host adapters, Serial Advanced Technology Attachment (SATA) and external SATA (eSATA) host adapters, Advanced Technology Attachment (ATA) and Parallel ATA (PATA) host adapters, Fibre Channel interface adapters, Ethernet adapters, or the like.

Communication interface 1122 may also allow computing system 1110 to engage in distributed or remote computing. For example, communication interface 1122 may receive instructions from a remote device or send instructions to a remote device for execution.

As illustrated in FIG. 11, computing system 1110 may also include at least one display device 1124 coupled to communication infrastructure 1112 via a display adapter 1126. Display device 1124 generally represents any type or form of device capable of visually displaying information forwarded by display adapter 1126. Similarly, display adapter 1126 generally represents any type or form of device configured to forward graphics, text, and other data from communication infrastructure 1112 (or from a frame buffer) for display on display device 1124.

As illustrated in FIG. 11, computing system 1110 may also include at least one input device 1128 coupled to communication infrastructure 1112 via an input interface 1130. Input device 1128 generally represents any type or form of input device capable of providing input, either computer or human generated, to computing system 1110. Examples of input device 1128 include, without limitation, a keyboard, a pointing device, a speech recognition device, or any other input device.

As illustrated in FIG. 11, computing system 1110 may also include a primary storage device 1132 and a backup storage device 1133 coupled to communication infrastructure 1112 via a storage interface 1134. Storage devices 1132 and 1133 generally represent any type or form of storage device or medium capable of storing data and/or other computer-readable instructions. For example, storage devices 1132 and 1133 may be a magnetic disk drive (e.g., a so-called hard drive), a floppy disk drive, a magnetic tape drive, an optical disk drive, a flash drive, or the like. Storage interface 1134 generally represents any type or form of interface or device for transferring data between storage devices 1132 and 1133 and other components of computing system 1110. A storage device like primary storage device 1132 can store information such as full backup images, incremental backup images, and/or backup metadata.

In certain embodiments, storage devices 1132 and 1133 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1132 and 1133 may also include other similar structures or devices for allowing computer software, data, or other computer-readable instructions to be loaded into computing system 1110. For example, storage devices 1132 and 1133 may be configured to read and write software, data, or other computer-readable information. Storage devices 1132 and 1133 may also be a part of computing system 1110 or may be a separate device accessed through other interface systems.

Many other devices or subsystems may be connected to computing system 1110. Conversely, all of the components and devices illustrated in FIG. 11 need not be present to practice the embodiments described and/or illustrated herein. The devices and subsystems referenced above may also be interconnected in different ways from that shown in FIG. 11.

Computing system 1110 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 1110 for storage in memory via a network such as the Internet or upon a carrier medium.

The computer-readable medium containing the computer program may be loaded into computing system 1110. All or a portion of the computer program stored on the computer-readable medium may then be stored in system memory 1116 and/or various portions of storage devices 1132 and 1133. When executed by processor 1114, a computer program loaded into computing system 1110 may cause processor 1114 to perform and/or be a means for performing the functions of one or more of the embodiments described and/or illustrated herein. Additionally or alternatively, one or more of the embodiments described and/or illustrated herein may be implemented in firmware and/or hardware. For example, computing system 1110 may be configured as an application specific integrated circuit (ASIC) adapted to implement one or more of the embodiments disclosed herein.

Figure 12:
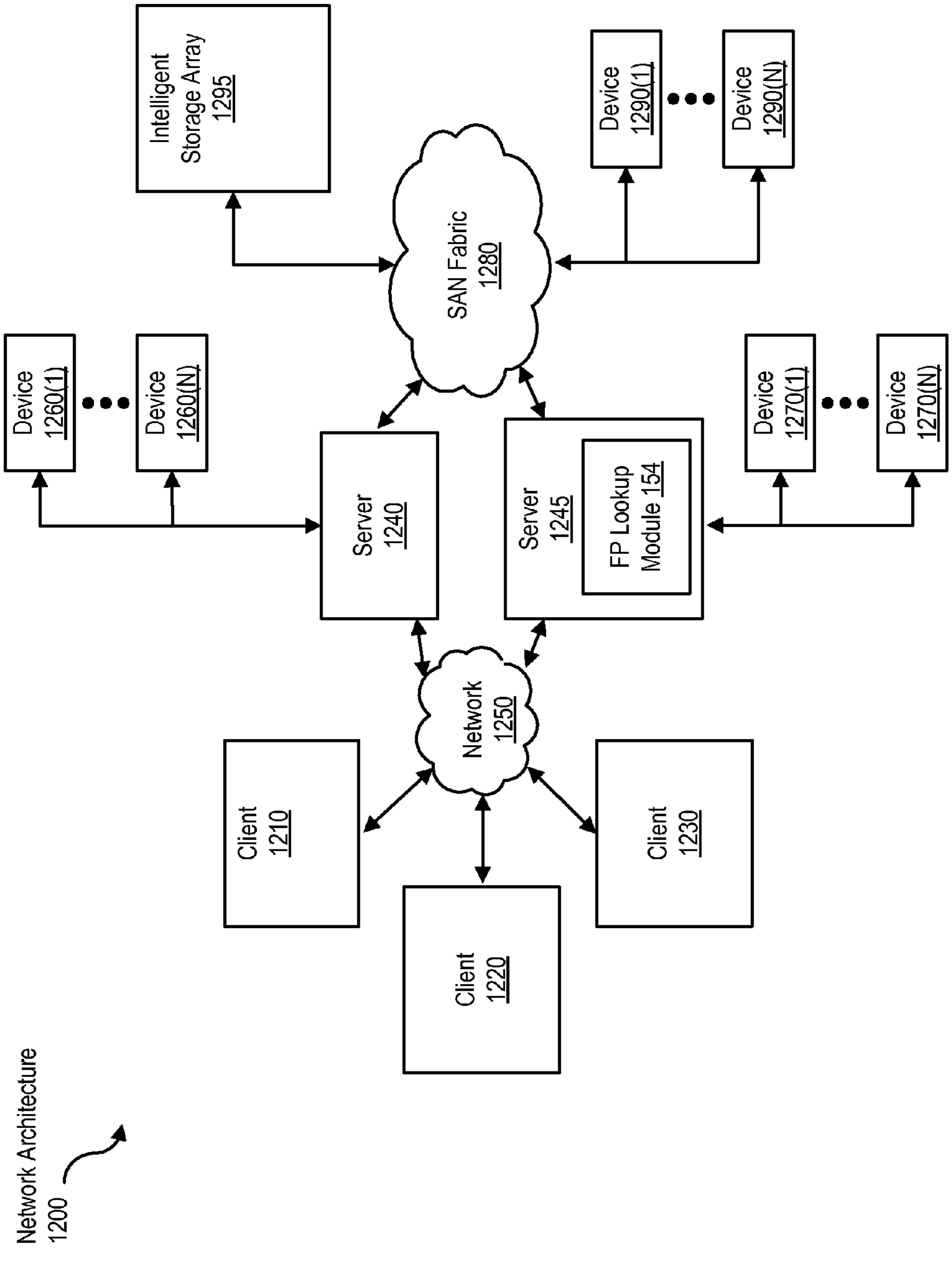
FIG. 12 is a block diagram of a networked system, illustrating how various computing devices can communicate via a network, according to one embodiment.

FIG. 12 is a block diagram of a network architecture 1200 in which client systems 1210, 1220, and 1230 and servers 1240 and 1245 may be coupled to a network 1250. Client systems 1210, 1220, and 1230 generally represent any type or form of computing device or system, such as computing system 1110 in FIG. 11.

Similarly, servers 1240 and 1245 generally represent computing devices or systems, such as application servers or database servers, configured to provide various database services and/or run certain software applications. Network 1250 generally represents any telecommunication or computer network including, for example, an intranet, a wide area network (WAN), a local area network (LAN), a personal area network (PAN), or the Internet. In one example, one or more of client systems 1210, 1220, and/or 1230 may include a fingerprint lookup module 154 as shown in FIG. 1.

As illustrated in FIG. 12, one or more storage devices 1260(1)-(N) may be directly attached to server 1240. Similarly, one or more storage devices 1270(1)-(N) may be directly attached to server 1245. Storage devices 1260(1)-(N) and storage devices 1270(1)-(N) generally represent any type or form of storage device or medium capable of storing data and/or other computer-readable instructions. In certain embodiments, storage devices 1260(1)-(N) and storage devices 1270(1)-(N) may represent network-attached storage (NAS) devices configured to communicate with servers 1240 and 1245 using various protocols, such as Network File System (NFS), Server Message Block (SMB), or Common Internet File System (CIFS). Such storage devices can store backup information and storage configuration information, as described above.

Servers 1240 and 1245 may also be connected to a storage area network (SAN) fabric 1280. SAN fabric 1280 generally represents any type or form of computer network or architecture capable of facilitating communication between multiple storage devices. SAN fabric 1280 may facilitate communication between servers 1240 and 1245 and a plurality of storage devices 1290(1)-(N) and/or an intelligent storage array 1295. SAN fabric 1280 may also facilitate, via network 1250 and servers 1240 and 1245, communication between client systems 1210, 1220, and 1230 and storage devices 1290(1)-(N) and/or intelligent storage array 1295 in such a manner that devices 1290(1)-(N) and array 1295 appear as locally attached devices to client systems 1210, 1220, and 1230. As with storage devices 1260(1)-(N) and storage devices 1270(1)-(N), storage devices 1290(1)-(N) and intelligent storage array 1295 generally represent any type or form of storage device or medium capable of storing data and/or other computer-readable instructions.

In certain embodiments, and with reference to computing system 1110 of FIG. 11, a communication interface, such as communication interface 1122 in FIG. 11, may be used to provide connectivity between each client system 1210, 1220, and 1230 and network 1250. Client systems 1210, 1220, and 1230 may be able to access information on server 1240 or 1245 using, for example, a web browser or other client software. Such software may allow client systems 1210, 1220, and 1230 to access data hosted by server 1240, server 1245, storage devices 1260(1)-(N), storage devices 1270(1)-(N), storage devices 1290(1)-(N), or intelligent storage array 1295. Although FIG. 12 depicts the use of a network (such as the Internet) for exchanging data, the embodiments described and/or illustrated herein are not limited to the Internet or any particular network-based environment.

In at least one embodiment, all or a portion of one or more of the embodiments disclosed herein may be encoded as a computer program and loaded onto and executed by server 1240, server 1245, storage devices 1240(1)-(N), storage devices 1270(1)-(N), storage devices 1290(1)-(N), intelligent storage array 1295, or any combination thereof. All or a portion of one or more of the embodiments disclosed herein may also be encoded as a computer program, stored in server 1240, run by server 1245, and distributed to client systems 1210, 1220, and 1230 over network 1250.

In some examples, all or a portion of one of the systems in FIGS. 1, 11, and 12 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In addition, one or more of the components described herein may transform data, physical devices, and/or representations of physical devices from one form to another. For example, a fingerprint lookup module may transform the behavior of a deduplication system such that migration operations can be completed in a deduplication environment.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:

receiving a first fingerprint, wherein the first fingerprint is received at a destination computing device from a source computing device, and the first fingerprint is associated with a first data segment stored by the source computing device;

identifying a first fingerprint type associated with the first fingerprint;

performing a migration operation, wherein the migration operation comprises determining whether the first fingerprint is stored in a first fingerprint sub-index of a fingerprint lookup table, wherein the first fingerprint sub-index is configured to store fingerprints of the first fingerprint type, and determining whether a corresponding second fingerprint is included in a second fingerprint sub-index of the fingerprint lookup table, wherein the second fingerprint sub-index is configured to store fingerprints of a second fingerprint type, and the first fingerprint type and the second fingerprint type are different from one another; and transmitting an indication to the source computing device that the first data segment has been migrated to the destination computing device, wherein the transmitting is performed in response to a determination that the first fingerprint is stored in the first fingerprint sub-index.

2. The method of claim 1, further comprising:

generating the corresponding second fingerprint, in response to a determination that the corresponding second fingerprint is not included in the second fingerprint sub-index; and associating the corresponding second fingerprint with the first fingerprint, wherein the associating comprises storing the corresponding second fingerprint in the second fingerprint sub-index.

3. The method of claim 1, further comprising:

adding the first fingerprint to the first fingerprint sub-index, in response to a determination that the first fingerprint is not stored in the first fingerprint sub-index.

4. The method of claim 1, wherein the second fingerprint sub-index comprises an associated fingerprint for each fingerprint in the first fingerprint sub-index.

5. The method of claim 1, wherein the identifying comprises requesting information from the source computing device, and the information comprises an identification of the first fingerprint type.

6. The method of claim 1, wherein the migration operation further comprises:

requesting that the first data segment be transferred from the source computing device to the destination computing device.

7. The method of claim 1, further comprising:

creating the first fingerprint sub-index, in response to a determination that the first fingerprint type does not match any fingerprint type associated with an existing fingerprint sub-index.

8. A non-transitory computer readable storage medium storing program instructions executable to:

receive a first fingerprint, wherein the first fingerprint is received at a destination computing device from a source computing device, and the first fingerprint is associated with a first data segment stored by the source computing device;

identify a first fingerprint type associated with the first fingerprint;

perform a migration operation, wherein the migration operation comprises determining whether the first fingerprint is stored in a first fingerprint sub-index of a fingerprint lookup table, wherein the first fingerprint sub-index stores is configured to store fingerprints of the first fingerprint type, and determining whether a corresponding second fingerprint is included in a second fingerprint sub-index of the fingerprint lookup table, wherein the second fingerprint sub-index is configured to store fingerprints of a second fingerprint type, and the first fingerprint type and the second fingerprint type are different from one another; and transmitting an indication to the source computing device that the first data segment has been migrated to the destination computing device, wherein the transmitting is performed in response to a determination that the first fingerprint is stored in the first fingerprint sub-index.

9. The non-transitory computer readable storage medium of claim 8, wherein the instructions are further executable to:

generate the corresponding second fingerprint, in response to a determination that the corresponding second fingerprint is not included in the second fingerprint sub-index; and associate the corresponding second fingerprint with the first fingerprint, wherein associating the corresponding second fingerprint with the first fingerprint comprises storing the corresponding second fingerprint in the second fingerprint sub-index.

10. The non-transitory computer readable storage medium of claim 8, wherein the instructions are further executable to:

add the first fingerprint to the first fingerprint sub-index, in response to a determination that the first fingerprint is not stored in the first fingerprint sub-index.

11. The non-transitory computer readable storage medium of claim 8, wherein the second fingerprint sub-index comprises an associated fingerprint for each fingerprint in the first fingerprint sub-index.

12. The non-transitory computer readable storage medium of claim 8, wherein the instructions are further executable to:

create the first fingerprint sub-index, in response to a determination that the first fingerprint type does not match any fingerprint type associated with an existing fingerprint sub-index.

13. A system comprising:

one or more processors; and a memory coupled to the one or more processors, wherein the memory stores program instructions executable by the one or more processors to:

receive a first fingerprint, wherein the first fingerprint is received at a destination computing device from a source computing device, and the first fingerprint is associated with a first data segment stored by the source computing device;

identify a first fingerprint type associated with the first fingerprint;

perform a migration operation, wherein the migration operation comprises determining whether the first fingerprint is stored in a first fingerprint sub-index of a fingerprint lookup table, wherein the first fingerprint sub-index stores is configured to store fingerprints of the first fingerprint type, and determining whether a corresponding second fingerprint is included in a second fingerprint sub-index of the fingerprint lookup table, wherein the second fingerprint sub-index is configured to store fingerprints of a second fingerprint type, and the first fingerprint type and the second fingerprint type are different from one another; and transmit an indication to the source computing device that the first data segment has been migrated to the destination computing device, wherein transmitting the indication is performed in response to a determination that the first fingerprint is stored in the first fingerprint sub-index.

14. The system of claim 13, wherein the instructions are further executable to:

generate the corresponding second fingerprint, in response to a determination that the corresponding second fingerprint is not included in the second fingerprint sub-index; and associate the corresponding second fingerprint with the first fingerprint, wherein associating the corresponding second fingerprint with the first fingerprint comprises storing the corresponding second fingerprint in the second fingerprint sub-index.

15. The system of claim 13, wherein the instructions are further executable to:

add the first fingerprint to the first fingerprint sub-index, in response to a determination that the first fingerprint is not stored in the first fingerprint sub-index.

16. The system of claim 13, wherein the second fingerprint sub-index comprises an associated fingerprint for each fingerprint in the first fingerprint sub-index.

17. The system of claim 13, wherein the instructions are further executable to:

create the first fingerprint sub-index, in response to a determination that the first fingerprint type does not match any fingerprint type associated with an existing fingerprint sub-index.

* * * * *